United States Patent [19]
Humphrey, Jr. et al.

[11] Patent Number: 5,922,493
[45] Date of Patent: Jul. 13, 1999

[54] POLYMERIC ELECTRODE AND ELECTROLYTE ARTICLE OF MANUFACTURE

[75] Inventors: J. Stevenson Humphrey, Jr., Phoenixville, Pa.; Scott R. Gaboury, Wilmington, Del.

[73] Assignee: Elf Atochem North America, Inc., Philadelphia, Pa.

[21] Appl. No.: 08/785,285

[22] Filed: Jan. 21, 1997

Related U.S. Application Data

[63] Continuation of application No. 08/399,701, Mar. 3, 1995, abandoned.

[51] Int. Cl.$^6$ .................... H01M 4/40; H01M 4/38; H01M 10/40
[52] U.S. Cl. ................. 429/316; 429/175; 429/177; 429/309; 429/231.8
[58] Field of Search .................... 429/177, 185, 429/217, 192, 209, 175, 309, 316, 231.8

[56] References Cited

U.S. PATENT DOCUMENTS

| | | |
|---|---|---|
| 4,384,047 | 5/1983 | Benzinger et al. . |
| 5,086,351 | 2/1992 | Couput et al. . |
| 5,296,318 | 3/1994 | Gozdz et al. . |
| 5,348,818 | 9/1994 | Asami et al. ............... 428/213 |
| 5,418,091 | 5/1995 | Gozdz et al. . |
| 5,460,904 | 10/1995 | Gozdz et al. . |
| 5,540,741 | 7/1996 | Gozdz et al. . |
| 5,571,634 | 11/1996 | Gozdz et al. . |

FOREIGN PATENT DOCUMENTS

| | | |
|---|---|---|
| 0 090 598 | 10/1983 | European Pat. Off. . |
| 3-14729 | 1/1991 | Japan . |
| WO 95/06332 | 3/1995 | WIPO . |

OTHER PUBLICATIONS

Schmutz, et al. "A New Rechargeable Plastic Li–ion Battery" Bell 186th ECS, Florida, Oct. 1994, pp.
Bell Communication Research, "Bellcore's New Battery Technology Supports Shrinking Consumer Electronics Products", Bellcore News Release, Mar. 1994 pp. 1–4.
"Proceedings of the 34th International Power Sources Symposium" Catalog Number 90CH2863–9, Jun. 25–28, 1990 pp. 408–410.
Philadelphia Inquirer, "Manufacturing a Battery That's Better", Aug. 4, 1994, pp. C1 an C4.
Holton et al. "Extractable Analysis of Moified PVDF Polymers Utilized in DI Water Applications" Ultrapure Water, May/Jun. 1993, pp. 47–52.
Kynar and Kynar Flex Technical Brochure, ELF Atochem. (no date).
Guyomard et al. "Rocking–Chair or Lithium–Ion Rechargeable Lithium Batteries", Advanced Materials. May 1994, 6, No. 5., pp. 408–412.
Guyomard et al. "Recharbeable $Li_{1+x}Mn_2O_4$/Carbon Cells With a New Electrolyte Composition", J. Electrochem. Soc. vol. 140, No. 11, Nov. 1993 pp. 3071–3081.
Signh et al. "Zinc–bromine Battery for Energy Storage", Journal of Power Sources, 35 (1991) (no month) pp. 405–410.
Jul. 12, 1996 communication from the European Patent Office in Application EP 95 12 0660 including Search Report and Annex there to.

*Primary Examiner*—John S. Maples
*Attorney, Agent, or Firm*—Finnegan, Henderson Farabow, Garrett & Dunner, L.L.P.

[57] ABSTRACT

An article of manufacture is disclosed comprising an electrochemical cell having a positive electrode, an absorber-separator and a negative electrode wherein at least one of the electrodes or absorber-separator comprises a porous polyvinylidene fluoride. The porous polyvinylidene fluoride electrodes have an electrode material combined therewith, and the porous polyvinylidene fluoride absorber-separator has an electrolyte material combined therewith.

36 Claims, 1 Drawing Sheet

POLYMERIC ELECTRODE AND ELECTROLYTE ARTICLE OF MANUFACTURE

This application is a continuation of application Ser. No. 08/399,701, filed Mar. 3, 1995, now abandoned.

BACKGROUND OF THE INVENTION

1. Field of the Invention

The field of the invention is electrochemical cells having electrodes and an absorber-separator wherein at least one of the electrodes or the absorber-separator is constructed of a porous synthetic polymer, the electrode materials having electrode material combined therewith and the absorber-separator having an electrolyte combined therewith.

2. Description of Related Art

Guyomard and Tarascon, in an article "Rocking-Chair or Lithium-Ion Rechargeable Lithium Batteries," *Adv. Mater.* 1994, 6, No. 5, pp. 408–12, describe a new lithium polymer electrolyte rechargeable cell and review the recent advances in the field of Li-ion rechargeable batteries.

Early lithium batteries used an intercalation material as a positive electrode which had the ability to reversibly incorporate lithium ions in its structure. The intercalation material sometimes is referred to as a "lithium sponge." The intercalation material was employed as an anode whereas the cathode consisted of lithium metal, the two electrodes being separated by a conductive electrolyte. The intercalation material consisted of layered chalcogenides such as titanium disulfide but, more recently, oxides have been studied which allow higher operating voltages and higher specific energies.

Although primary lithium cells have been commercialized, secondary lithium cells have encountered problems arising from the use of lithium metal and a liquid organic electrolyte primarily because of dendritic regrowth of lithium on the anode upon cycling which short circuits the cell. Elimination of the problem associated with lithium metal dendritic growth is now possible by employing a material able to intercalate lithium ions reversibly at very low voltages, leading to the so-called "lithium-ion," "rocking-chair," or "swing" lithium rechargeable batteries. These lithium cells operate on the principle that they contain not lithium metal, but lithium ions which are rocked back and forth between two intercalation materials (the two lithium sponges) during the charging and discharging parts of the cycle. One electrode material intercalates lithium ions, the positive during discharge and the negative during charge, while the other one deintercalates lithium at the same time. Accordingly, the lithium ion that cycles in the cell must be initially present in the structure of one of the electrode materials.

The rocking-chair approach has been possible only since about 1990 because of the previous lack of suitable reversible negative electrode materials. It was only after the discovery of some forms of carbon as lithium reversible intercalation materials that lead to the employment of carbon LiCoO$_2$ by Sony Energytec Inc. and carbon LiNiO$_2$ by Moli Energy Ltd. Bellcore also developed a rechargeable battery based on carbon Li$_x$Mn$_2$O$_4$ at about the same time. See, Tarascon and Guyomard, *J. Electrochem. Soc.* 1991, 138, 2864.

The rocking chair battery can be represented in terms of the following chain: M$_1$/composite positive electrode (CPE)/electrolyte (El)/composite negative electrode (CNE)/M$_2$, where CPE and CNE are a mixture of the active material, carbon black and an organic binder, El is an electrolyte consisting of a mixture of several organic solvents and one or several lithium salts, and M$_1$ and M$_2$ are the external current collectors for the positive and the negative electrodes respectively. Complete chemical and electrochemical compatibility between all the elements in the chain is required.

Each half-cell, i.e., M$_1$ CPE El and M$_2$/CNE El, first has to be optimized against a pure lithium metal electrode, which acts as a reference (constant voltage) electrode. In the final rocking-chair cell, the mass of the positive and negative electrode materials has to be balanced to give the same capacity for lithium deintercalation from the CPE and lithium intercalation in the CNE processes that occur at the same time when the rocking-chair cell is being charged.

One of the difficulties that occurred in rocking-chair cells was electrolyte oxidation during the charge cycle which became a more serious problem with increasing operating temperatures. Electrolyte oxidation leads to irreversible losses in capacity because of the generation of chemical species that deposit as an insulating layer on the electrode surface or evolve as a gas, thus increasing the internal pressure in the cell. Electrolyte oxidation is the main failure mechanism for this cell technology.

Bellcore recently developed a series of new ethylene carbonate (EC), dimethyl-carbonate (DMC), LiPF$_6$-based electrolyte compositions that are stable against oxidation and high operating temperatures and have been effectively used in a cell containing a carbon Li$_x$Mn$_2$O$_4$ electrode, where x is 1 or 2. Other electrolytes that have been developed in this regard include LiAsF$_6$, LiClO$_4$, LiN(CF$_3$SO$_2$)2, LiPF$_4$, LiCF$_3$SO$_3$ and LiSbF$_6$. It was found that these electrolytes and especially LiPF$_6$ are compatible with carbon LiNiO$_2$ and carbon LiCoO$_2$ electrode materials as well in rocking-chair cell applications.

Prior to the introduction of carbon Li$_x$Mn$_2$O$_4$, it was found that the time needed to discharge the rocking-chair cell is shorter than the charge time by a factor of about 25% which is due to the carbon electrode where electrons are irreversibly consumed during the first lithium intercalation by side reactions at the surface of the carbon grains. About 25% of the total lithium is trapped in a superficial layer and cannot be cycled in the cell anymore. It was found that LiMn$_2$O$_4$ material intercalates reversibly one extra lithium per formula unit, leading to the composition Li$_2$Mn$_2$O$_4$. Thus it can be seen in the foregoing formula that x has a value of 1 or 2, and the excess lithium in the permanganate is used to compensate exactly the capacity lost on carbon during the first charge of the cell. This principle of the use of an extra lithium reservoir results in an increase of the specific capacity and energy of the system by about 10% which is not possible with the LiCoO$_2$ and LiNiO$_2$ carbon materials for which no air-stable higher lithium compositions are possible.

Another factor which further advanced development of rocking-chair cells was the use of a petroleum coke (a disordered graphite) as the carbon material in the negative electrode, which intercalates one lithium for twelve carbon atoms. This corresponds to about half the theoretical capacity of graphite in which the maximum lithium composition is LiC$_6$. Recently, it was discovered that graphite can now be used with a true capacity corresponding to about 0.9 Li per 6 carbon atoms at cycling rates of one hour. See, Tarascon and Guyomard, *Electro. Chem. Acta* 1993, 38, 1221. The capacity is then almost doubled and the average voltage is reduced by about 0.3 volts compared to coke. Replacing coke by graphite in rocking-chair cells will result in an increase of specific energy by about 30%.

The use of lithium-ion cells in which both electrodes comprise intercalation materials such as lithiated manganese oxide and carbon are further described by Tarascon in U.S. Pat. No. 5,196,279. Guyomard and Tarascon, *J. Electrochem Soc.* Vol. 140, No. 11, November 1993, pp. 3071–81 further describes these rocking chair rechargeable batteries.

The separator or absorber-separator in the cell which is positioned in between and abutting the two electrodes presents some important considerations in construction of the cell. For example, the conductivity of the material in combination with the electrolyte should be sufficiently high so as not to impede the efficiency of the cell. Tsuchida et al., *Electrochemica Acta,* Vol. 28, 1983, No. 5, pp. 591–95 and No. 6, pp. 833–37 indicated that polyvinylidene fluoride compositions were capable of exhibiting ionic conductivity above about $10^{-5}$ S/cm only at elevated temperatures, reportedly due to the inability of the composition to remain homogeneous, i.e., free of salts and polymer crystallites, at or below room temperature. Enhanced ionic conductivity was obtained by Tsuchida and his coworkers, however, by incorporation of lithium salts and solvents that were compatible with both the polymer and salt components.

Accordingly, as can be seen from the foregoing references, the selection of the polymer employed in the rocking-chair cell has to be made to enhance ionic conductivity, and compatibility with the lithium salts and solvents employed as the electrolyte.

Lithium ion access to the surface of the active material is an important consideration in designing these types of cells. If the polymer coats the surface of the active materials, while still allowing lithium ion passage through it, then interaction of the electrode active materials with the electrolyte solution is minimized which is an additional benefit.

Gozdz et al., U.S. Pat. No. 5,296,318, describe a rocking-chair cell utilizing a polyvinylidene fluoride copolymer in the fabrication of the electrodes and the absorber-separator which contains the electrolyte. A rechargeable battery based on lithium intercalation compound electrodes and an interposed electrolyte flexible polymer containing a lithium salt dissolved in a polymer-compatible solvent is disclosed. The polymer comprises a copolymer of vinylidene fluoride and 8 to 25% of hexafluoropropylene.

In a specific example, the absorber-separator is based on an ethylene carbonate:propylene carbonate solution of $LiPF_6$ in an 88:12 vinylidene fluoride hexafluoropropylene polymer whereas the positive electrode is based on this polymer in combination with SS carbon black $LiMn_2O_4$ and $LiPF_6$, further in combination with an aluminum metal lead attached to it. The negative electrode was based on the same polyvinylidene fluoride copolymer in combination with powdered petroleum coke, SS carbon black and the same $LiPF_6$ electrolyte in ethylene carbonate:propylene carbonate solvent. The negative electrode in turn was connected to a copper metal lead.

Menassen et al. "A Polymer Chemist's View On Fuel Cell Electrodes," *Proceeding Of The 34th International Power Source Symposium,* Jun. 25–28, 1990, pp. 408–10, studied polyvinylidene fluoride binders in fuel cell electrodes and made a comparison to polytetrafluoroethylene (PTFE) sintered electrodes. It was noted that with polyvinylidene fluoride electrodes using the phase-in version method that contrary to the classical electrodes, where the active material resides in little islands between the sintered PTFE particles where the surface area of the carbon is of prime importance, much larger pores were obtained with polyvinylidene fluoride whose walls were made up of a composite polymer with carbon particles in a continuous polymeric matrix.

Accordingly, it would be an advantage to provide an electrochemical cell having electrodes and an absorber-separator that would make the utilization of the active material more efficient.

Additionally, it would be an advantage to provide segregation of an active composite polymer on the surface of active pores in a porous and especially a microporous electrode and/or absorber-separator which could allow for varying the amount of the polymer in the electrode or absorber-separator in order to obtain increased strength with minimum effect on cell performance.

These advantages would especially be valuable in very thin flexible secondary or rechargeable batteries that are currently being produced for consumer electronic products.

It would also be advantageous to provide a rechargeable cell, and especially a lithium rocking-chair type of battery that would readily lend itself to ease of fabrication from polymeric materials that could be either formed from solution, or by extrusion and which could be readily enveloped or packaged in an enclosure by fusion or heat lamination techniques.

Accordingly, the present invention is directed to an article of manufacture comprising an electrochemical cell that substantially obviates one or more of these and other problems due to limitations and disadvantages of the related art.

SUMMARY OF THE INVENTION

These and other advantages are obtained according to the present invention.

Additional features and advantages of the invention will be set forth in the description which follows, and in part will be apparent from the description, or may be learned by practice of the invention. The objectives and other advantages of the invention will be realized and obtained by the article of manufacture particularly pointed out in the written description and claims hereof as well as the appended drawings.

To achieve these and other advantages and in accordance with the purpose of the invention, as embodied and broadly described, the invention comprises an electrochemical cell having a positive electrode, an absorber-separator sometimes referred to as a solid electrolyte, and a negative electrode wherein at least one of the electrodes or the absorber-separator comprises a porous polyvinylidene fluoride, the porous polyvinylidene fluoride electrodes having an electrode material combined therewith and said porous polyvinylidene fluoride absorber-separator having an electrolyte material combined therewith.

The porous polyvinylidene fluoride of the invention comprises an open cell porous structure or a closed cell porous structure, or mixtures thereof, but preferably an open cell structure. Microporous polyvinylidene fluoride materials are especially suitable.

The cell diameter, or the openings, or interstices in the porous polyvinylidene fluoride matrix may be anywhere from about 0.01 to about 100, particularly from about 0.1 to about 10, and especially from about 0.1 to about 1.5 microns in diameter. The openings of the microporous polyvinylidene fluoride matrix, falling within the above range is anywhere from about 0.05 to about 25, and especially from about 0.1 to about 0.5 microns.

The electrode or electrolyte materials that are combined with the porous polyvinylidene fluoride are defined herein, and it is intended that this combining includes placement of these materials on the exterior and/or interior surfaces of the porous polyvinylidene fluoride as well as forming a substantially homogeneous or heterogeneous mixture of these materials in the porous polyvinylidene fluoride.

The porous polyvinylidene fluoride may be a solvent cast polyvinylidene fluoride, an open cell polyvinylidene fluoride foam or a sintered polyvinylidene fluoride powder.

The polyvinylidene fluoride polymer may comprise either a homopolymer or copolymer, wherein the copolymers are either heterogeneous or homogeneous copolymers of vinylidene fluoride and hexafluoropropylene, or tetrafluoroethylene, or both, but especially hexafluoropropylene, where the comonomer is present from about 7 to about 25% by weight.

The electrochemical cell of the invention preferably comprises a rechargeable lithium intercalation battery referred to sometimes as a rocking-chair battery as described specifically herein.

The use of homogeneous copolymers for the manufacture of the electrodes and electrolyte matrices is especially preferred.

The electrochemical cell can be enveloped in polyvinylidene fluoride especially a homopolymer of polyvinylidene fluoride. One method of encapsulating the electrochemical cell is to heat seal it to the encapsulating material which in one embodiment may be in the form of a film or plurality of films.

One advantage in using the homopolymer is that it is not soluble in the same variety of solvents as the copolymer but nonetheless can be thermally bonded to it. Accordingly, the homopolymer can be used as a barrier to prevent solvent-copolymer mixtures from being exposed to sources of contamination by the simple expedient of heat bonding the homopolymer to the copolymer that contains solvents employed in the electrochemical cells described herein.

In another embodiment, the polyvinylidene fluoride is produced either by an emulsion or a suspension polymerization process, especially an emulsion polymerization process and comprises an exceptionally high purity polymer i.e. a polymer with trace amounts of impurities i.e., impurities in the ppb (parts per billion) range.

In an especially important aspect, the adhesion of the PVDF electrode films to the metallic conductors may be enhanced by incorporating a small amount of another compatible polymeric material. Polymethyl methacrylate and other acrylic polymers are well known to exhibit compatibility with PVDF and function as an adhesive in coatings. Polymers and copolymers based on acrylic acid, methacrylic acid and the low molecular weight alkyl esters thereof, where the alkyl moiety has from 1 to about 4 carbon atoms may be used in this regard and will be referred to herein as acrylic polymers, all of which are well known in the art. Anywhere from about 0.1% to about 50% by weight and especially about 0.2% to about 40% by weight and preferably about it to about 10% by weight of the acrylic polymer may be added to the polyvinylidene fluoride to form a blend therewith, especially a substantially homogeneous blend.

The polyvinylidene fluoride electrodes or absorber-separator or encapsulating material may also be cross-linked especially where the cross-linking is effected by irradiating the polyvinylidene fluoride with a high energy electron beam.

The polyvinylidene fluoride may be either in the alpha, beta or gamma configuration; however, the beta configuration is preferred to enhance ionic conductivity.

Lastly, the polyvinylidene fluoride used to encapsulate the electrochemical cell may contain a high energy radiation attenuator such as boron trinitride or gadolinium salts.

It is to be understood that both the foregoing general description and the following detailed description are exemplary and explanatory, and further, the following description is intended to provide a more detailed explanation of the invention as claimed.

BRIEF DESCRIPTION OF THE DRAWING

The accompanying drawing, which is incorporated in and constitutes a part of this specification, illustrates embodiments of the invention, and together with the description, serves to explain the objects, advantages and principles of the invention. In the drawing.

DETAILED DESCRIPTION

The electrochemical cells of the present invention are based on a positive electrode, an absorber-separator sometimes referred as a solid electrolyte and a negative electrode operatively associated with one another when at least one of the electrodes or the absorber-separator, and preferably both electrodes and the absorber-separator comprise a porous polyvinylidene fluoride wherein the porous polyvinylidene fluoride electrodes have an electrode material combined therewith and the porous polyvinylidene fluoride absorber-separator has an electrolyte material combined therewith. A plurality of electrodes and absorber-separator elements can be used in the cell structure in order to increase the voltage, and/or amperage of the combined elements in a manner well known in the art.

Polyvinylidene fluoride having an open structure for porosity provides enhanced electrolyte mobility in combination with the intrinsic ionic conductivity effects of the polymer. Porous polyvinylidene fluoride electrode or separator-absorber combined with electrode or electrolyte materials at the surface of the pores of the porous polymer make the utilization of the active material, whether electrode material or electrolyte material more efficient and provide a method for the easy manufacture of more efficient electrodes and separator-absorber structures.

It is also believed that the segregation of the active materials on the surface of active pores will allow for varying the amount of binder in the electrode or the separator-absorber to enhance strength with minimum effect on cell performance. The electrochemical cells formed in this way therefore will have improved mechanical properties and can be made to be self-supporting i.e., secondary reinforcing structures do not have to be employed such as a metal or other conventional battery casing material.

This also leads to ease of fabrication where the electrochemical cell is enveloped or enclosed in a polyvinylidene fluoride which will adhere to the porous electrodes and/or the absorber-separator structures. Adhesion can be obtained by simple heat bonding or rf welding or other similar processes well known in the art. Adhesives are not required, but importantly, the exterior part of the electrochemical cell (i.e., the envelope) is of the same type or substantially the same type of material as the electrodes and absorber-separator thereby simplifying and reducing the cost of manufacture in that only one type of material is used for the structural components of the cell as compared to either conventional dry cell or secondary cell construction.

Polyvinylidene fluoride absorbs rf frequency and may also be heated by dielectric techniques. Heat guns may also be used for sealing polyvinylidene fluoride surfaces under pressure. Welding rods may be also be employed to heat seal two pieces easily as is done in the fabrication of larger polyvinylidene fluoride structures. The joints obtained are usually as strong as the basic resins employed. Because polyvinylidene fluoride polymers are abrasion resistant and tough as well as chemical resistant, they are useful in the internal and external element of the battery and, as noted previously, can be assembled by non-adhesive means by heat bonding.

By selecting polyvinylidene fluoride polymers that are either extremely flexible or somewhat rigid, structures can be fabricated that are in turn either flexible or somewhat rigid. Further in this regard, enhanced rigidity can be obtained by cross-linking the polyvinylidene fluoride either chemically, but preferably by employing high energy radiation such as high energy (about 10 to about 20 Mrad) electron beam radiation, with some attendant dehydrofluorination. The potential benefit is the stabilization of amorphous regions in the porous polyvinylidene fluoride copolymers, i.e. inhibition of crystallization over time which is important since ionic conductivity of the electrolyte occurs primarily in the amorphous or open regions.

As noted previously, polyvinylidene fluoride polymers affect ionic conductivity in a manner that makes them suitable for the fabrication of electrochemical cells.

Since mobility of charged species is required in electrochemical cells, the migration in polyvinylidene fluoride polymers will be through the amorphous phase. Depending upon the temperature, the chain conformations and motions will be an important detriment to the transport kinetics, compounded further by any specific electrostatic effects due to the polar nature of the polyvinylidene fluoride chain.

In the triboelectric series, most polymers stabilize electrons. Polyvinylidene fluoride, however, is unique in preferentially stabilizing positive holes and is one of the most effective media in this regard, presumably due to the highly negative gem-difluorocarbon group.

In the special case of lithium ion batteries such as the rocking-chair batteries as described herein, the high specific charge and small ionic size of the lithium ion may lead to specific interactions in the host polyvinylidene fluoride environment, considering the extent of the non-polarizable, negative gem-difluorocarbon groups available.

Since conductivity is inversely related to crystallinity of the polyvinylidene fluoride polymer, it has been determined that copolymers of vinylidene fluoride with about 7 to about 25% hexafluoropropylene sufficiently reduces the crystalline structure of the polymer without sacrificing mechanical properties so that acceptable ionic conductivity effects of the polymer can be obtained. Further in this regard, it is believed that the different conformations of the polymer also affect the conductivity of the overall electrochemical properties of polyvinylidene fluoride due to specific ion-dipole interactions of lithium cations and the gem-difluorocarbon dipole groups of the polymer.

Polyvinylidene fluoride homopolymers and copolymers form the stable alpha conformation which comprises a chain structure in which the fluorine and hydrogen substituted carbons are alternating along the backbone. Mechanical orientation of solid polyvinylidene fluoride such as film or fiber may produce the beta. conformation which crystallizes with all the fluorines on one faces of the chain. The beta form is necessary to achieve ferroelectric activity by orienting all of the beta chains in the same direction to form a dipolar structure with net charge separation on the faces of the film. When cast from solvents, the gamma form develops which is a distorted version of the alpha form. Accordingly, as used herein, the alpha form will refer to conformations that are entirely alpha, a mixture of alpha and gamma or entirely gamma conformations.

When employing polyvinylidene fluoride polymers in the manufactures of electrodes or absorber-separators, plasticizers such as organic carbonates (e.g., ethylene carbonate, propylene carbonate, dimethylcarbonate and the like) are utilized in order minimize the effect of the crystalline structure and promote ionic conductivity. Other solvents or plasticizers may also be employed including diethoxyethane, diethylcarbonate, dimethoxyethane, dipropyl carbonate and mixtures thereof especially the two or three component mixtures.

Similarly, and in accord with the present invention, the various porous structures, depending on the their tensile strength, can be mechanically oriented by stretching or the application of tensile forces in order to enhance the amount of beta conformation within the polymer structure and thereby possibly promote ionic conductivity depending upon the electrolyte and polyvinylidene fluoride composition.

Using solvent and non-solvent combinations, polyvinylidene fluoride resins are cast in thin porous membranes. This method is described by Benzinger et al. in U.S. Pat. No. 4,384,047 which is incorporated herein by reference. The electrode materials or the electrolyte materials as described herein can be incorporated into the polyvinylidene fluoride solution prior to casting it into a film or sheet, after which the solution is converted to a porous polyvinylidene fluoride membrane combined with the electrode or electrolyte materials. These films or sheets, either with or without the electrode or electrolyte materials can be any where from about 0.25 to about 100, particularly from about 0.5 to about 10, and especially from about 1 to about 8 mils thick, and are especially suitable for further treatment by stretching or the application of tensile forces in order to promote the beta conformation in the porous polyvinylidene fluoride.

There are three classes of organic liquids, that may be used to make solutions or dispersions of polyvinylidene fluoride polymers. Active solvents are those organic liquids that dissolve or swell polyvinylidene fluoride at room temperature and typically consist of lower alkyl ketones, esters and amides. Latent solvents are those organic liquids that do not dissolve polyvinylidene fluoride at room temperature; however, will dissolve polyvinylidene fluoride at elevated temperatures and typically are medium chain length alkyl ketones, esters, glycol ethers and organic carbonates. Non-solvents are organic liquids that do not dissolve or swell polyvinylidene fluoride up to the boiling point of the liquid or the crystalline melting point of the polyvinylidene fluoride, whichever condition is met first. These liquids typically are aromatic hydrocarbons, aliphatic hydrocarbons and chlorinated hydrocarbons or other chlorinated organic liquids. The solvents and latent solvents are used in the manufacture of the porous, and especially the microporous polyvinylidene fluoride films or sheets of the present invention.

Examples of these organic liquids are given in Table I which follows.

TABLE I

LIQUIDS TO PREPARE SOLUTIONS OR DISPERSIONS OF PVDF

| ACTIVE SOLVENTS | LATENT SOLVENTS (APPROX. DISSOLUTION TEMPERATURE IN ° C.) | NON SOLVENTS |
|---|---|---|
| Acetone | Butyrolactone (65) | Hexane |
| Tetrahydrofuran | Isophorone (75) | Pentane |
| Methyl Ethyl Ketone | Methyl Isoamyl Ketone (102) | Benzene |
| Dimethyl Formamide | Cyclohexanone (70) | Toluene |
| Dimethyl Acetamide | Dimethyl Phthalate (110) | Methanol |
| Tetramethyl Urea | Propylene Glycol Methyl Ether (115) | Ethanol |
| Dimethyl Sulfoxide | Propylene Carbonate (80) | Carbon Tetrachloride |
| Trimethyl Phosphate | Diacetone Alcohol (100) | o-Dichlorobenzene |
| N-Methyl Pyrrolidone | Glycerol Tricetate (100) | Trichloroethylene |

The suitability of any given liquid depends upon the exact PVDF resin type and grade.

Other methods have been developed for the manufacture of open cell foam porous polyvinylidene fluoride polymers which are formulated to contain chemical or physical blowing agents such as absorbed carbon dioxide. It is preferred to use physical blowing agents in the manufacture of electrochemical cells since trace amounts of the chemical blowing agents in the foam structure could adversely affect the functioning of the cell. Where carbon dioxide or comparable physical blowing agents are employed, they are incorporated into the polyvinylidene fluoride at super critical pressures followed by heat treatment to expand the article thus produced. Open cell films of varying thickness have been made in this manner with excellent mechanical integrity and which have specific gravities about one as compared to solid polyvinylidene fluoride which has a specific gravity of from about 1.76 to about 1.78.

Similarly, polyvinylidene fluoride powders can be sintered to form a porous structure by heating the powders in a non-solvent slurry, or under pressure between opposed platens, until the individual particles sufficiently melt flow into one another to form the desired open cell structure. Other art known methods for sintering powdered polymers such as PTFE for forming open cell porous structures as described by Menassen et al. "A Polymer Chemist's View On Fuel Cell Electrodes," *Proceeding Of The 34th International Power Source Symposium*, Jun. 25–28, 1990, pp. 408–10 can also be used.

Polymers that may be used in the practice of the present invention and their physical properties are set forth in Tables II, III, and IV that follow.

In Table III, unimodal refers to a singe peak in the chromatograms. Bimodal refers to a chromatogram that shows inflections which are indicative of two distinct polymer distributions having different peak molecular weights.

TABLE II

KYNAR ® MOLECULAR STRUCTURE (1)

| GRADE | REVERSE ADDITION (2) MOL. % | % HFP MOL. % | (3) WT. % |
|---|---|---|---|
| KYNAR ® 460 | 11.6 | None | |
| | 11.7 | None | |
| KYNAR ® 460 Black | 11.3 | None | |
| KYNAR ® 500 | 11.6 | None | |
| KYNAR ® 710 | 10.2 | None | |
| | 10.1 | None | |
| KYNAR ® 720 | 9.9 | None | |
| | 10.0 | None | |
| KYNAR ® 740 | 9.9 | 1.0 | 2.3 |
| | | None | |
| KYNAR ® 2800 GL | | 4.0 | 8.9 |
| | | 4.5 | 9.9 |
| KYNAR ® 2800 RL | | 4.4 | 9.7 |
| | | 5.1 | 11.2 |
| KYNAR ® 2850 | | 3.2 | 7.2 |
| KYNAR ® 2900 | | 5.0 | 11.0 |
| | | 5.6 | 11.2 |

(1) Fluorine-19 Nuclear Magnetic Resonance (NMR)
(2) Head-Head, Tail-Tail Structure = —$CH_2CF_2CF_2CH_2$— or $CF_2CH_2CH_2CF_2$—
(3) Standard Deviation = 0.1–0.5%
HFP = hexafluoropropylene

TABLE III

KYNAR ® MOLECULAR WEIGHT AND MOLECULAR WEIGHT DISTRIBUTION (1)

| GRADE | TYPE | MELT VIS. (KP) | Mn | Mw | Mw/Mn |
|---|---|---|---|---|---|
| KYNAR ® 460 | Bimodal | 26.2 | 115,000 | 572,500 | 4.8 |
| KYNAR ® 460 Black | Bimodal | 25.3 | 72,200 | 373,500 | 5.2 |
| KYNAR ® 500 | Bimodal | 31.3 | 101,300 | 523,000 | 5.2 |
| KYNAR ® 710 | Unimodal | 5.3 | 70,900 | 177,100 | 2.5 |
| KYNAR ® 720 | Unimodal | 9.7 | 85,700 | 244,600 | 2.6 |
| KYNAR ® 740 | Unimodal | 18.8 | 107,100 | 275,900 | 2.6 |
| KYNAR ® 2800 GL | Bimodal | 25.5 | 129,800 | 497,200 | 3.8 |
| | Bimodal | 25.5 | 126,800 | 385,100 | 3.0 |
| | Bimodal | 22.9 | 63,700 | 232,500 | 3.7 |
| KYNAR ® 2800 RL | Bimodal | 23.8 | 107,500 | 371,900 | 2.3 |
| KYNAR ® 2850 | Bimodal | 20.2 | 108,000 | 454,700 | 4.2 |
| KYNAR ® 2900 | Bimodal | 17.8 | 118,600 | 377,000 | 3.2 |
| KYNAR ® 761 | Unimodal | | 84,000 | 377,000 | 4.5 |
| 761 | | | 145,000 | 426,000 | 2.9 |
| KYNAR ® ADS 9300 | Unimodal | 5.9 | 35,500 | 86,900 | 2.5 |

(1) By Gel Permeation Chromatography (GPC)
Mn = Number Average Mol. Wt.
Mw = Weight Average Mol. Wt.

TABLE IV

ULTRA PURE KYNAR ® VDR PVDF GRADES FOR BATTERY APPLICATIONS

| PVDF HOMOPOLYMERS | PVDF COPOLYMERS |
|---|---|
| KYNAR ® 461 fine powder; high mw, broad mwd resin, mp 160° C., soluble in acetone, bulk soluble in acetone, bulk density 20 #/cu. ft | KYNAR ® FLEX 2801 fine powder; medium, mw, broad mwd, mp 145° C., contains HFP comonomer, has about 64% fluorine by weight flexural modulus 90,000 psi, crystallinity about 40% |
| KYNAR ® 460 pellets: derived by 461, has much broader mwd than 461, crystallinity about 45% | KYNAR ® FLEX 2821 or 2822 fine powders; low mw, broad mwd, mp 148° C., contains HFP copolymers, similar properties to 2801; 2822 |
| KYNAR ® 741/761 fine powder: med. and high mw grades, | KYNAR ® FLEX 2851 fine powder: high mw, broad mwd, mp 155° C., 5 wt. % HFP, |

TABLE IV-continued

ULTRA PURE KYNAR ® VDR PVDF GRADES FOR BATTERY APPLICATIONS

| PVDF HOMOPOLYMERS | PVDF COPOLYMERS |
|---|---|
| narrow mwd, mp 170°, high crystallinity at equilibrium (55–60%), partial solubility in acetone, 220,000 psi flexural modulus, even "fluffier" than 461 powder | 170,000 psi flexural modulus more like homopolymers, improved stress crack resistance over homopolymers in aqueous caustic, very smooth surface extrusions and moldings |
| KYNAR ® 740 Pellets: extruded form of 741, equivalent in all respects except physical form | KYNAR ® FLEX 2800, 2850: extruded forms of 2801 and 2851, equivalent in all respects except physical form |
| KYNAR ® 301 very fine powder, similar to 461 except slightly different mw and mwd | KYNAR ® 7201 fine powder: TFE-copolymer, mp 125° C., low crystallinity, very flexible, solubility very different from HFP-copolymers, med. mw resin, low crystallinity |
| KYNAR ® R711/721 fine powders: very low and low viscosity versions with essentially same characteristics as 741/761 except lower mw | KYNAR ® 9301 fine powder: TFE, HFP-terpolymer, mp 100° C., very soluble compared to other resins, very soft and flexible, low mw resin, low crystallinity |
| KYNAR ® 710/720 | KYNAR ® FLEX 2751 fine powder: Higher HFP content than 2801/2821, mp 138° C., very flexible, low mw resin, very low crystallinity |
| pellets: Extruded from 711/721 powders with essentially no difference in properties except physical form | |
| KYNAR ® LATEX 32: Essentially 301F supplied as stabilized latex (non-fluorosurfactant at relatively high levels) | RC-10089: heterogeneous development HFP-copolymer available as powder or pellets with high 168° C. mp but flexibility of random HFP-copolymers above, properties similar to elastomer modified thermoplastics |

NOTE: Other grades available from ElfAtochem include a medium viscosity KYNAR ® 1000HD (pellets) or VLD (fine powder) and low viscosity KYNAR ® 400HD or VLD. A different process is utilized in the isolation of these grades.
HFP = hexafluoropropylene; TFE = Tetrafluoroethylene As noted before, the polyvinylidene homopolymers and copolymers of the present invention are especially suitable for the manufacture of porous matrices because of their purity as indicated in Tables A, B and C that follow.

TABLE A

Bulk Trace Elements of PVDF Resins
Neutron Activation Analysis Results

| | PVDF Homopolymer Control | | | Modified PVDF Resins | | |
|---|---|---|---|---|---|---|
| | 460-1 | 460-2 | 740-3 | 2800 | 2850 | 2750 |
| Weight g | 1.011 | 1.011 | 0.94 | 0.999 | 0.988 | 0.964 |
| Element | ppb | ppb | ppb | ppb | ppb | ppb |
| Sodium | 8.31E + 01 | 7.59E + 01 | 4.46E + 01 | 3.71E + 01 | 5.79E + 01 | 8.78E + 01 |
| Potassium | 2.90E + 01 | <9.5E + 00 | <7.2E + 00 | <6.1E + 00 | 3.35E + 01 | <9.4E + 00 |
| Calcium | <5.0E + 03 | <3.3E + 03 | <4.4E + 03 | <3.9E + 03 | <5.3E + 03 | <6.7E + 03 |
| Scandium | <2.0E − 02 | 2.98E − 02 | <2.0E − 02 | <2.3E − 02 | <3.2E − 02 | 3.75E − 02 |
| Titanium | <6.0E + 03 | <3.6E + 03 | <5.6E + 03 | <3.4E + 03 | <4.5E + 03 | <8.4E + 03 |
| Chromium | 5.97E + 01 | 5.32E + 01 | 1.54E + 01 | 1.91E + 01 | 6.18E + 00 | 1.19E + 01 |
| Iron | 2.77E + 02 | <1.6E + 02 | <1.7E + 02 | <2.0E + 02 | <2.7E + 02 | <2.4E + 02 |
| Cobalt | 3.82E + 00 | 5.46E + 00 | 7.05E + 00 | 9.10E + 00 | 2.63E + 00 | 1.03E + 01 |
| Nickel | <8.0E + 01 | <7.5E + 01 | <8.1E + 01 | <9.8E + 01 | <1.2E + 02 | <1.2E + 02 |
| Copper | 9.81E + 00 | 1.02E + 01 | 4.51E + 00 | 7.79E + 00 | 6.52E + 00 | 1.87E + 02 |
| Zinc | 2.14E + 01 | 2.14E + 01 | <1.3E + 01 | 3.95E + 01 | <2.1E + 01 | 1.62E + 02 |
| Gallium | <1.9E − 01 | <1.5E − 01 | <1.2E − 01 | 1.24E − 01 | <1.7E − 01 | <1.6E − 01 |
| Arsenic | <1.2E − 01 | <8.0E − 02 | <9.7E − 02 | 1.23E − 01 | 3.25E − 01 | <1.3E − 01 |
| Selenium | <2.5E + 00 | <2.0E + 00 | <2.7E + 00 | <2.7E + 00 | <4.2E + 00 | <3.5E + 00 |
| Bromine | 4.49E + 00 | 3.96E + 00 | 1.66E + 01 | 1.12E + 01 | 1.02E + 01 | 2.49E + 01 |
| Rubidium | <7.1E + 00 | <6.3E + 00 | <6.6E + 00 | <7.6E + 00 | <1.0E + 01 | <9.8E + 00 |
| Strontium | <1.6E + 02 | <1.4E + 02 | <1.8E + 02 | <2.1E + 02 | <2.7E + 02 | <2.6E + 02 |
| Zirconium | <1.5E + 02 | <1.3E + 02 | <1.4E + 02 | <1.6E + 02 | <2.2E + 02 | <2.0E + 02 |
| Molybdenum | <1.1E + 00 | 1.66E + 00 | <1.4E + 00 | 2.16E + 00 | <1.1E + 00 | 1.83E + 00 |
| Silver | <1.9E + 00 | <1.7E + 00 | <1.9E + 00 | <2.2E + 00 | <3.0E + 00 | <2.9E + 00 |
| Cadmium | <2.8E + 00 | <1.6E + 00 | <2.8E + 00 | <1.8E + 00 | <3.2E + 00 | <4.1E + 00 |
| Indium | <4.1E + 00 | <3.6E + 00 | <5.1E + 00 | <4.6E + 00 | <6.5E + 00 | <5.3E + 00 |
| Tin | <1.9E + 02 | <1.5E + 02 | <1.9E + 02 | <2.2E + 02 | <4.2E + 02 | <3.0E + 02 |
| Antimony | 1.34E + 00 | 1.30E + 00 | 1.25E + 00 | 4.03E + 00 | 2.47E + 01 | 2.43E + 00 |
| Cesium | <3.5E − 01 | <3.2E − 01 | <3.5E − 01 | <4.3E − 01 | <5.4E − 01 | <5.2E − 01 |
| Barium | <3.7E + 01 | <2.8E + 01 | <4.2E + 01 | <3.9E + 01 | <5.8E + 01 | <5.6E + 01 |
| Lanthanum | 1.36E − 01 | 1.40E − 01 | <3.5E − 02 | 8.53E − 02 | 5.48E − 02 | 1.99E − 01 |
| Cerium | <1.2E + 00 | <1.2E + 00 | <1.6E + 00 | <1.4E + 00 | <2.0E + 00 | <1.7E + 00 |
| Europium | <1.4E − 01 | <1.4E − 01 | <1.4E − 01 | <1.7E − 01 | <2.2E − 01 | <1.9E − 01 |
| Terbium | <1.6E − 01 | <1.4E − 01 | <1.6E − 01 | <1.8E − 01 | <2.4E − 01 | <2.3E − 01 |
| Ytterbium | <8.6E − 02 | <5.8E − 02 | <8.6E − 02 | <7.4E − 02 | <1.4E − 01 | <1.3E − 01 |
| Hafnium | <2.4E − 01 | <1.9E − 01 | <2.4E − 01 | <2.4E − 01 | <3.8E − 01 | <3.6E − 01 |
| Tantalum | <2.6E − 01 | <2.4E − 01 | <2.3E − 01 | <3.0E − 01 | <4.0E − 01 | <3.6E − 01 |
| Tungsten | <1.8E − 01 | 2.54E − 01 | 1.99E − 01 | 9.80E − 01 | 2.57E − 01 | 3.61E − 01 |
| Indium | <5.1E − 03 | <3.5E − 03 | <4.7E − 03 | <4.7E − 03 | <8.4E − 03 | <6.5E − 03 |

TABLE A-continued

Bulk Trace Elements of PVDF Resins
Neutron Activation Analysis Results

|  | PVDF Homopolymer Control | | | Modified PVDF Resins | | |
|---|---|---|---|---|---|---|
|  | 460-1 | 460-2 | 740-3 | 2800 | 2850 | 2750 |
| Weight g | 1.011 | 1.011 | 0.94 | 0.999 | 0.988 | 0.964 |
| Element | ppb | ppb | ppb | ppb | ppb | ppb |
| Platinum | <1.1E + 02 | <6.9E + 01 | <1.2E + 02 | <8.1E + 01 | <1.5E + 02 | <1.7E + 02 |
| Gold | 6.37E − 03 | 5.82E − 03 | 6.06E − 03 | 1.03E − 02 | 2.42E − 02 | 4.92E − 02 |
| Mercury | <9.1E − 01 | <7.1E − 01 | <8.6E − 01 | <8.8E − 01 | <1.5E + 00 | <1.2E + 00 |
| Thorium | <2.6E − 01 | <1.7E − 01 | <2.4E − 01 | <2.3E − 01 | <4.2E − 01 | <3.3E − 01 |
| Uranium | <2.2E − 01 | <1.3E − 01 | <2.1E − 01 | <1.3E − 01 | <2.1E − 01 | <2.8E − 01 |

TABLE B

Leachable Elements of Modified-PVDF Grades

| | Grades | | | | Grades | | |
|---|---|---|---|---|---|---|---|
| Element | 2850 ppb | 2800 ppb | 2750 ppb | Element | 2850 ppb | 2800 ppb | 2750 ppb |
| Results by ICP-MS | | | | | | | |
| Lithium | <0.30 | <0.30 | <0.30 | Tellurium | <0.25 | <0.25 | <0.25 |
| Boron | <0.06 | <0.06 | <0.06 | Cesium | <0.08 | <0.08 | <0.08 |
| Lanthanum | <0.05 | <0.05 | <0.05 | Barium | <0.08 | <0.08 | <0.08 |
| Magnesium | <0.20 | <0.20 | <0.20 | Cerium | <0.04 | <0.04 | <0.04 |
| Aluminum | <0.10 | <0.10 | <0.10 | Praseodymium | <0.10 | <0.10 | <0.10 |
| Titanium | <0.10 | <0.10 | <0.10 | Neodymium | <0.09 | <0.09 | <0.09 |
| Vanadium | <0.11 | <0.11 | <0.11 | Samarium | <0.06 | <0.06 | <0.06 |
| Chromium | <0.26 | <0.26 | <0.26 | Europium | <0.03 | <0.03 | <0.03 |
| Manganese | <0.06 | <0.06 | <0.06 | Gadolinium | <0.05 | <0.05 | <0.05 |
| Copper | <0.08 | <0.08 | <0.08 | Terbium | <0.10 | <0.10 | <0.10 |
| Cobalt | <0.10 | <0.10 | <0.10 | Dysprosium | <0.01 | <0.01 | <0.01 |
| Nickel | <0.08 | <0.08 | <0.08 | Holmium | <0.10 | <0.10 | <0.10 |
| Zinc | <0.05 | <0.05 | <0.05 | Erbium | <0.05 | <0.05 | <0.05 |
| Gallium | <0.40 | <0.40 | <0.40 | Thulium | <0.04 | <0.04 | <0.04 |
| Germanium | <0.03 | <0.03 | <0.03 | Ytterbium | <0.04 | <0.04 | <0.04 |
| Arsenic | <0.03 | <0.03 | <0.03 | Lutetium | <0.05 | <0.05 | <0.05 |
| Rubidium | <0.01 | <0.01 | <0.01 | Hafnium | <0.10 | <0.10 | <0.10 |
| Strontium | <0.10 | <0.10 | <0.10 | Tantalum | <0.08 | <0.08 | <0.08 |
| Yttrium | <0.03 | <0.03 | <0.03 | Tungsten | <0.02 | <0.02 | <0.02 |
| Zirconium | <0.11 | <0.11 | <0.11 | Rhenium | <0.10 | <0.10 | <0.10 |
| Niobium | <0.03 | <0.03 | <0.03 | Iridium | <0.02 | <0.02 | <0.02 |
| Molybdenum | <0.02 | <0.02 | <0.02 | Platinum | <0.13 | <0.13 | <0.13 |
| Ruthenium | <0.12 | <0.12 | <0.12 | Gold | <0.03 | <0.03 | <0.03 |
| Palladium | <0.10 | <0.10 | <0.10 | Mercury | <0.01 | <0.01 | <0.01 |
| Silver | <0.03 | <0.03 | <0.03 | Thallium | <0.08 | <0.08 | <0.08 |
| Cadmium | <0.08 | <0.08 | <0.08 | Lead | <0.07 | <0.07 | <0.07 |
| Indium | <0.07 | <0.07 | <0.07 | Bismuth | <0.15 | <0.15 | <0.15 |
| Tin | <0.25 | <0.25 | <0.25 | Thorium | <0.03 | <0.03 | <0.03 |
| Antimony | 0.16 | <0.08 | <0.08 | Uranium | <0.03 | <0.03 | <0.03 |
| Results by GFFA | | | | | | | |
| Calcium | 3.40 | 1.60 | 6.70 | | | | |
| Iron | 0.60 | 0.18 | 0.20 | | | | |

Note: Water extraction at 80° C. for 24 hours of 1 gram in 100 mL

TABLE C

Trace Compound Analyses
Anlon Analysis by Ion Chromatography

| | Modifier PVDF Grades | | |
|---|---|---|---|
| | 2850 ppb | 2800 ppb | 2750 ppb |
| Fluoride | 21.70 | 23.60 | 31.20 |
| Chloride | 4.97 | 4.64 | 4.51 |

TABLE C-continued

Trace Compound Analyses
Anlon Analysis by Ion Chromatography

| | Modifier PVDF Grades | | |
|---|---|---|---|
| | 2850 ppb | 2800 ppb | 2750 ppb |
| Bromide | 0.13 | 0.13 | 0.13 |
| Nitrate | 5.79 | 5.59 | 6.53 |
| Phosphate | <0.05 | <0.05 | <0.05 |
| Sulfate | 10.80 | 7.13 | 6.15 |
| Lithium | <0.05 | 0.07 | <0.05 |
| Sodium | 3.40 | 2.12 | 2.89 |
| Ammonium | 4.19 | 5.91 | 9.48 |
| Potassium | 1.69 | 0.51 | 0.23 |
| Other Analyses | | | |
| Soluble silica | <3.00 | <3.00 | <3.00 |

Note: Water extraction at 80° C. or 24 hours of 1 gram in 100 mL

The impurities as shown in Tables A, B, and C can vary within plus or minus about 10%, and especially plus or minus about 5% of the values shown. These impurity measurements are also applicable to all polyvinylidene polymers employed according to the invention.

A porous film made by casting polyvinylidene from a mixture of solvents and non-solvents as described by Benzinger et al. in U.S. Pat. No. 4,383,047, which is about 10 mils thick after formation from the casting solution, is utilized for the manufacture of an electrochemical cell. The polymer comprises a copolymer of polyvinylidene fluoride and about 12% hexafluoropropylene and had a molecular weight of about $380 \times 10^3$ MW, Atochem Kynar® FLEX 2801. This film is used in fabricating an absorber-separator or solid electrolyte by making a solution of $LiPF_6$ in a 1:1 mixture by weight of ethylene carbonate:propylene carbonate which is heated to about 125° C. and the porous copolymer film immersed in the solution until it is combined with the film.

Similarly, a positive electrode is made from the same porous copolymer. A dispersion of $LiMn_2O_4$, SS carbon black and $LiPF_6$ in a 1:1 mixture of ethylene carbonate and propylene carbonate along with tetrahydrofuran (THF) was combined with the porous film by soaking the film in the suspension which is agitated in a vibrating beaker in order to keep the solid material in suspension until adequately combined with the film. The film is then placed on an aluminum foil.

A negative electrode is prepared by making a dispersion or suspension of petroleum coke, SS carbon black and $LiPF_6$ in a 1:1 ethylene carbonate propylene carbonate solution in the same manner as was done for the preparation of the positive electrode and after combining the suspension with the porous film, a copper foil was placed on the film.

The proportions of the various components of the electrode and the absorber-separator or solid electrolyte are substantially the same as those set forth in Examples 1 and 8 Gozdz et al., U.S. Pat. No. 5,296,318.

The electrodes and electrolyte can also be made from sintered polyvinylidene fluoride by forming a dry blend of the electrode or electrolyte materials with powdered polyvinylidene fluoride. Dry mixing techniques, known in the art may be employed, such as tumbler type mixing. For example, the mixture of polyvinylidene fluoride powder and the electrode or electrolyte materials can be subjected to tumbling or ball milling for a time to sufficiently ensure that a good mixture is obtained. A steel or other metal vessel, or ceramic vessel is employed, especially where either is lined with a polyvinylidene fluoride or PTFE layer. In the case of ball milling, steel or other metal, or ceramic grinding balls, also coated with a polyvinylidene fluoride or PTFE layer are used. The polyvinylidene fluoride or PTFE coating is employed to substantially minimize or substantially eliminate the introduction of impurities into the system. The milled mixtures are formed into electrodes and electrolytes by the application of heat and pressure as noted herein.

Solvents such as ethylene carbonate and propylene carbonate, and their equivalents, especially as noted herein, including mixtures thereof, which are employed in the electrode or electrolyte can be added afterwards by soaking the electrodes and electrolyte structures in such solvents. The soaking can be carried out at room temperature or above to maximize the solvating effect of these materials and to produce optimum ionic conductivity in the electrodes or electrolyte.

Figure 1:
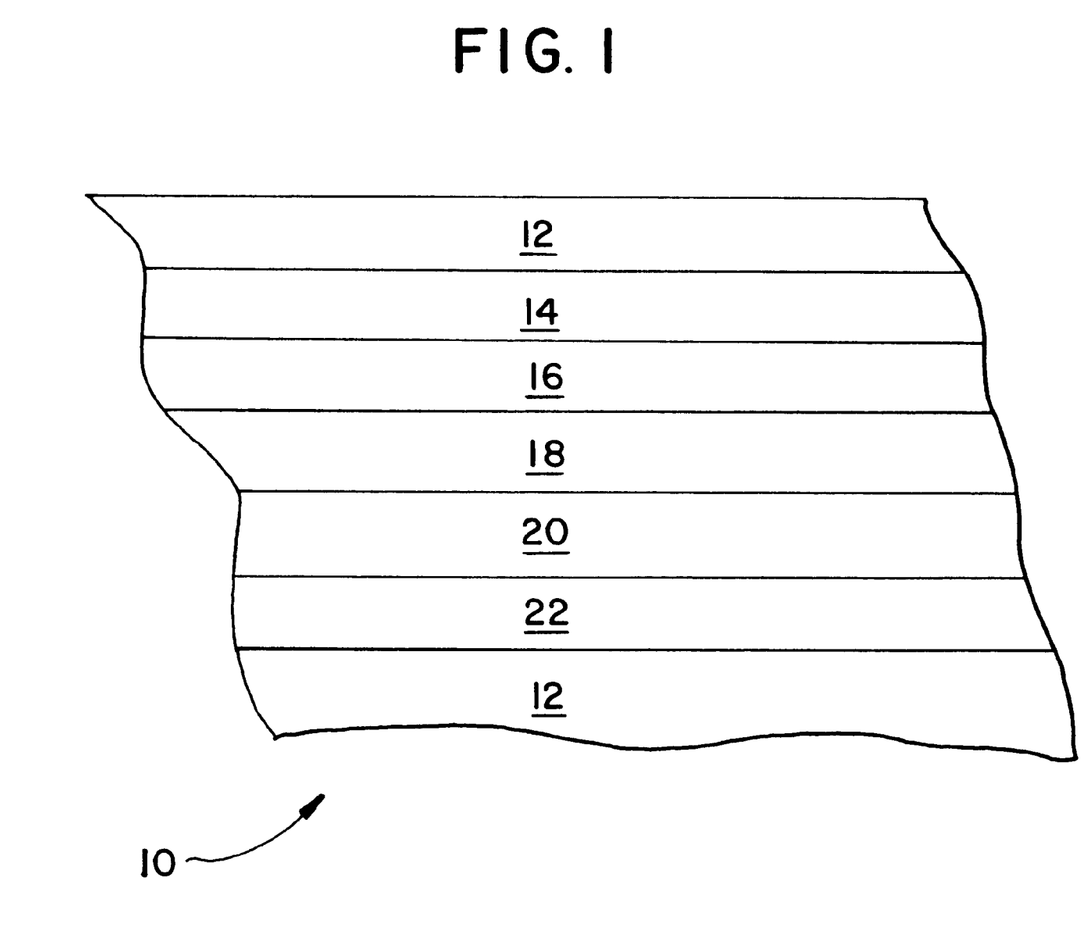
FIG. 1 is a cross-section of an electrochemical cell in accord with the present invention.

The positive electrode and the negative electrode thus prepared, are then placed on opposite sides of the absorber-separator prepared as described above with the copper and aluminum surfaces facing outwardly to form a cell as illustrated in FIG. 1 in which copper film 14 is shown as extending along one surface operatively associated with negative electrode 16 which is turn is also operatively associated with absorber-separator 18 combined with the electrolyte. Aluminum film 22 is in contact with positive electrode 20 on the other face of absorber-separator 18, all of the elements being operatively associated with one another. An envelope 12 of a polyvinylidene fluoride homopolymer extends completely around the cell. Envelope 12 may be a single film or a plurality of films e.g., two or three films and extends around all sides and completely envelops cell 10. Copper and aluminum leads (not shown) are passed through envelope 10 to make electrical contact with films 14 and 22, respectively and are connected to a load (not shown) to form an electric circuit.

The other electrolytes described herein for the rocking-chair cells may also be employed in lieu of the $LiPF_6$ salt and $LiNiO_2$ or $LiCoO_2$ materials substituted for the $LiMn_2O_4$ materials in the foregoing example. Additionally, graphite rather than petroleum coke may be employed in the manufacture of the negative electrode although, petroleum coke is especially preferred.

The porous polyvinylidene fluoride may also be employed in cells having a lithium organic electrolyte where the polymer is used either as a binder for particular electrode active materials, as a solid electrolyte for polymers cells, a porous mesh supporting a quasi-solid state gel electrolyte and as the cell base material.

The porous polymers as described herein can also be used in lithium/oxyhalide cells as a bottom insulator. They may also be used in zinc bromide cells as a binder for bipolar electrodes or in nickel-metal hydride cells as a binder for the hydride electrode or for the nickel electrode.

The porous polyvinylidene fluoride is also suitable for use in a silver-zinc cell where the porous polyvinylidene fluoride is used as a binder for the zinc electrode or in a lead-acid cell as a spacer between the electrodes and as a porous separator. The porous polyvinylidene fluoride may also be used in thermal batteries for the cathode active materials. In addition to nickel-metal hydride cells, the porous polyvinylidene fluoride may also be used in other alkaline cells such as nickel-cadmium cells, and zinc-air cells, especially where a buffered electrolyte is employed to counteract the dehydrohalogenation effect of the alkaline medium of these cells.

It will be apparent to those skilled in the art that modifications and variations can be made in the electrochemical cell of the present invention without departing from the spirit or scope of the invention. It is intended that these modifications and variations and their equivalents are to be included as part of this invention, provided they come within the scope of the appended claims.

What is claimed is:

1. An article of manufacture comprising a rechargeable lithium intercalation battery having a positive electrode, and absorber-separator and a negative electrode wherein at least the negative electrode comprises a porous polyvinylidene fluoride copolymer having an electrode material combined therewith, and said absorber-separator comprises a porous polyvinylidene fluoride copolymer having an electrolyte material combined therewith, wherein said porous polyvinylidene fluoride copolymer is a heterogeneous or homogeneous copolymer of vinylidene fluoride and from about 7% to about 25% hexafluoropropylene, tetrafluoroethylene, or mixtures thereof, and wherein said negative electrode comprises carbon Li combined with said porous polyvinylidine fluoride copolymer.

2. The article of manufacture of claim 1 where said porous polyvinylidene fluoride copolymer is a solvent cast polyvinylidene fluoride copolymer, an open cell polyvinylidene fluoride copolymer foam or a sintered polyvinylidene fluoride copolymer powder.

3. The article of manufacture of claim 1 where said copolymer comprises a homogeneous copolymer of vinylidene fluoride and hexafluoropropylene.

4. The battery of claim 1 wherein said absorber-separator comprises an electrolyte comprising a solution of at least one lithium salt combined with said porous polyvinylidene fluoride copolymer.

5. The battery of claim 4 wherein said lithium salt is $LiPF_6$, $LiAsF_6$, $LiClO_4$, $LiN(CF_3SO_2)2$, $LiPF_4$, $LiCF_3SO_3$ or $LiSbF_6$.

6. The battery of claim 3 wherein said positive electrode comprises carbon $Li_xMnO_4$ where x is 1 or 2, combined with said porous polyvinylidene fluoride copolymer, said absorber-separator comprises an electrolyte comprising $LiPF_6$ combined with said porous polyvinylidene fluoride copolymer.

7. The battery as in one of claims 1, 3 or 6 enveloped in polyvinylidene fluoride.

8. The battery of claim 7 enveloped in a plurality of polyvinylidene fluoride films.

9. The battery of claim 7 enveloped in a polyvinylidene fluoride homopolymer.

10. The battery of claim 8 enveloped in a polyvinylidene fluoride homopolymer.

11. The battery of claim 10 where said polyvinylidene fluoride homopolymer is bonded to at least one of said electrodes or electrolyte.

12. The article of manufacture as in one of claims 1, 3 or 6 wherein said polyvinylidene fluoride copolymer is a high purity polymer.

13. The article of manufacture of claim 12 wherein said polyvinylidene fluoride copolymer is produced by emulsion or suspension polymerization.

14. The article of manufacture of claim 12 wherein said polyvinylidene fluoride copolymer is produced by emulsion polymerization.

15. The article of manufacture as in one of claims 1, 3 or 6 wherein said polyvinylidene fluoride copolymer is cross-linked.

16. The article of manufacture of claim 15 wherein said polyvinylidene fluoride copolymer is cross linked by irradiation.

17. The article of manufacture as in one of claims 1, 3 or 6 wherein said polyvinylidene fluoride copolymer is alpha polyvinylidene fluoride.

18. The article of manufacture of claims 1, 3 or 6 wherein said polyvinylidene fluoride copolymer is beta polyvinylidene fluoride.

19. The article of manufacture of claim 18 where said polyvinylidene fluoride copolymer is a beta polyvinylidene fluoride copolymer formed by stress orienting an alpha polyvinylidene fluoride copolymer.

20. The article of manufacture of claim 6 where said cell is enveloped in a polyvinylidene fluoride containing a high energy radiation attenuator.

21. The article of manufacture of claim 20 where said high energy radiation attenuator comprises boron tri-nitride or gadolinium salts.

22. The article of manufacture as in one of claims 1, 3 or 6 wherein said polyvinylidene fluoride copolymer is a blend with an acrylic polymer.

23. The article of manufacture as in one of claims 1, 3 or 6 wherein said polyvinylidene fluoride copolymer is a blend with from about 1% to about 10% by weight of an acrylic polymer.

24. The article of manufacture of any one of claims 1, 2, 3 and 4, 5 and 6 wherein said electrode material or electrolyte material is on the exterior surfaces of said porous polyvinylidene fluoride copolymer and/or the interior surfaces of said porous polyvinylidene fluoride copolymer.

25. The article of manufacture of any one of claims 1, 2, 3 and 4, 5 and 6 wherein said positive electrode comprises carbon $Li_xMnO_4$ where x is 1 or 2, carbon $LiNiO_2$ or carbon $LiCoO_2$ combined with said porous polyvinylidene fluoride copolymer.

26. The article of manufacture of any one of claims 1, 2, 3 and 4, 5 and 6 wherein said porous polyvinylidene fluoride copolymer comprises an open cell porous structure or a closed cell porous structure, or mixtures thereof.

27. The article of manufacture of claim 7 wherein said porous polyvinylidene fluoride copolymer comprises an open cell porous structure or a closed cell porous structure, or mixtures thereof.

28. The article of manufacture of claim 12 wherein said porous polyvinylidene fluoride copolymer comprises an open cell porous structure or a closed celled porous structure, or mixtures thereof.

29. The article of manufacture of claim 15 wherein said porous polyvinylidene fluoride copolymer comprises an open cell porous structure or a closed celled porous structure, or mixtures thereof.

30. The article of manufacture of claim 17 wherein said porous polyvinylidene fluoride copolymer comprises an open cell porous structure or a closed celled porous structure, or mixtures thereof.

31. The article of manufacture of claim 18 wherein said porous polyvinylidene fluoride copolymer comprises an open cell porous structure or a closed celled porous structure, or mixtures thereof.

32. The article of manufacture of claim 20 wherein said porous polyvinylidene fluoride copolymer comprises an open cell porous structure or a closed celled porous structure, or mixtures thereof.

33. The article of manufacture of claim 21 wherein said porous polyvinylidene fluoride copolymer comprises an open cell porous structure or a closed celled porous structure, or mixtures thereof.

34. The article of manufacture of claim 22 wherein said porous polyvinylidene fluoride copolymer comprises an open cell porous structure or a closed celled porous structure, or mixtures thereof.

35. The article of manufacture of claim 24 wherein said porous polyvinylidene fluoride copolymer comprises an open cell porous structure or a closed celled porous structure, or mixtures thereof.

36. The article of manufacture of claim 25 wherein said porous polyvinylidene fluoride copolymer comprises an open cell porous structure or a closed celled porous structure, or mixtures thereof.

\* \* \* \* \*